US006292708B1

United States Patent
Allen et al.

(10) Patent No.: US 6,292,708 B1
(45) Date of Patent: Sep. 18, 2001

(54) DISTRIBUTED CONTROL SYSTEM FOR A SEMICONDUCTOR WAFER PROCESSING MACHINE

(75) Inventors: Robert F. Allen; Ricardo T. Jordan, both of Gilbert, AZ (US)

(73) Assignee: SpeedFam-IPEC Corporation, Chandler, AZ (US)

(*) Notice: Subject to any disclaimer, the term of this patent is extended or adjusted under 35 U.S.C. 154(b) by 0 days.

(21) Appl. No.: 09/096,066

(22) Filed: Jun. 11, 1998

(51) Int. Cl.[7] ........................................................ G06F 19/00
(52) U.S. Cl. ............................ 700/121; 700/3; 318/568.11
(58) Field of Search ........................................ 700/121, 1–3; 318/568.11, 568.2; 705/17, 21; 451/290.5

(56) References Cited

U.S. PATENT DOCUMENTS

| 5,136,222 | 8/1992 | Simmons et al. ............. 318/568.2 |
| 5,498,196 | * 3/1996 | Karlsrud et al. ............... 451/11 |
| 5,548,505 | 8/1996 | Simmons et al. ............... 700/1 |
| 5,558,568 | * 9/1996 | Talieh et al. ................... 451/303 |
| 5,649,854 | * 7/1997 | Gill, Jr. ........................... 451/290 |
| 5,975,966 | * 11/1999 | Allen et al. ..................... 451/5 |

FOREIGN PATENT DOCUMENTS

| 0 530 973 | 3/1993 | (EP) . |
| 0 740 241 | 10/1996 | (EP) . |

\* cited by examiner

*Primary Examiner*—William Grant
*Assistant Examiner*—Kidest Bahta
(74) *Attorney, Agent, or Firm*—Snell & Wilmer, LLP

(57) ABSTRACT

A distributed control system for a semiconductor wafer processing machine includes a master control module and a plurality of application control modules. Each of the application control modules and the master control module are capable of autonomous, independent operation. The master control module regulates the operation of the application control modules, and the application control modules govern a number of sub-procedures carried out by the wafer processing machine. The sub-procedures may be governed by respective processing recipes that are downloaded from the master control module to the application control modules via a network link architecture.

18 Claims, 6 Drawing Sheets

DISTRIBUTED CONTROL SYSTEM FOR A SEMICONDUCTOR WAFER PROCESSING MACHINE

TECHNICAL FIELD

The present invention relates generally to a control system for use with a semiconductor wafer processing machine. In particular, the present invention relates to a distributed control system that employs a plurality of functional modules capable of independently operating a portion of a semiconductor wafer processing machine.

BACKGROUND OF THE INVENTION

A number of processing systems exist for use during the manufacture of semiconductor wafers, magnetic memory disks, optical devices, and other delicate workpieces. For example, chemical mechanical polishing (CMP) machines are utilized to planarize the surfaces of semiconductor wafers, and wafer cleaning machines are utilized to clean and rinse the surfaces of such semiconductor wafers following the planarization process. Processing speed is an important factor in the semiconductor fabrication industry because increased product throughput relates directly to increased profitability. Accordingly, CMP machines, cleaning systems, and other processing devices are being developed in a manner that increases efficiency while maintaining reliability and robustness. Indeed, some semiconductor processing systems now utilize several combined subsystems in lieu of a number of individual distinct machines.

Semiconductor processing systems that combine several functions (e.g., polishing, cleaning, and rinsing) typically require intricate electronic control systems. Consequently, the efficiency and reliability of any given processing system may be directly related to the design and architecture of the control system. Furthermore, the cost of installation, testing, troubleshooting, and maintenance of the processing system may also be directly related to the complexity of the control system and how the control system interacts with the various functional components and subsystems of the processing system.

A prior art control system for a multiple function wafer processing system may employ a plurality of control modules concentrated in one central location, where each of the control modules are dependent upon a master controller. Such an architecture does not lend itself to independent testing and troubleshooting of the individual subsystems. In other words, such control systems require the entire processing system to be assembled and tested as an integral whole. Prior art control systems may employ individual control modules that are considered as "best in class" for their particular functions. Unfortunately, the "best in class" modules may be manufactured by different companies, which may present compatibility problems and cause the overall control system to be difficult to support and maintain. In addition, the use of "best in class" components may not necessarily result in the best combined control system.

Prior art control systems may not be adapted to independently control the different subsystems in a manner that enables continuous batch-specific processing with different polishing or cleaning parameters. Such prior art systems may be limited to the use of one processing recipe per run of wafers. Furthermore, such prior art control systems may control the operation of the processing system via serial instructions; the individual subsystems may be configured in a daisy chain arrangement. The use of serial instructions may lead to an unacceptable amount of wait time between processing stations and, consequently, an undesirably low processing throughput.

A prior art control system program for a semiconductor processing system may be integrally designed along with the application software associated with the processing system. With such an arrangement, changes to the control system hardware or software (e.g., type of processor, memory capacity, operating system, etc.) may require substantial modifications to the control system operating software. Similarly, any changes to the application-specific code associated with the processing system may require corresponding changes to the control system operating software.

SUMMARY OF THE INVENTION

Accordingly, it is an advantage of the present invention that an improved control system for use with a multifunction semiconductor processing system is provided.

Another advantage of the present invention is that it provides a control system that increases the efficiency, reliability, and robustness of a multifunction semiconductor processing system.

Another advantage is that the present invention provides a distributed control system having a plurality of independent control modules associated with a number of subsystems employed by a semiconductor processing system.

A further advantage of the distributed control system is that each subsystem may be individually tested and diagnosed without having the entire processing system active.

Another advantage of the present invention is that it provides a control system capable of regulating and controlling the application of different processing recipes during a single continuous run.

A further advantage of the control system is that it may control and regulate the various subsystems in a parallel manner to thereby reduce downtime and increase wafer throughput.

According to one aspect of the present invention, the control system is designed to utilize a separate software application that is compatible with the application software associated with the semiconductor processing system. This enables the control system to be modified independent of the application software or with minimal changes to the application software.

The above and other advantages of the present invention may be carried out in one form by a distributed control system for use in a multifunction semiconductor wafer processing system having a plurality of processing stations. Such a control system may include: a plurality of autonomous application control modules, each being configured to control a portion of a semiconductor wafer processing procedure; an autonomous master control module configured to communicate with and regulate the operation of the application control modules; and a data communication link configured to connect the application control modules and the master control module into a network arrangement.

BRIEF DESCRIPTION OF THE DRAWINGS

A more-complete understanding of the present invention may be derived by referring to the detailed description and claims when considered in connection with the Figures, where like reference numbers refer to similar elements throughout the Figures, and:

DETAILED DESCRIPTION OF A PREFERRED EMBODIMENT

Figure 1:
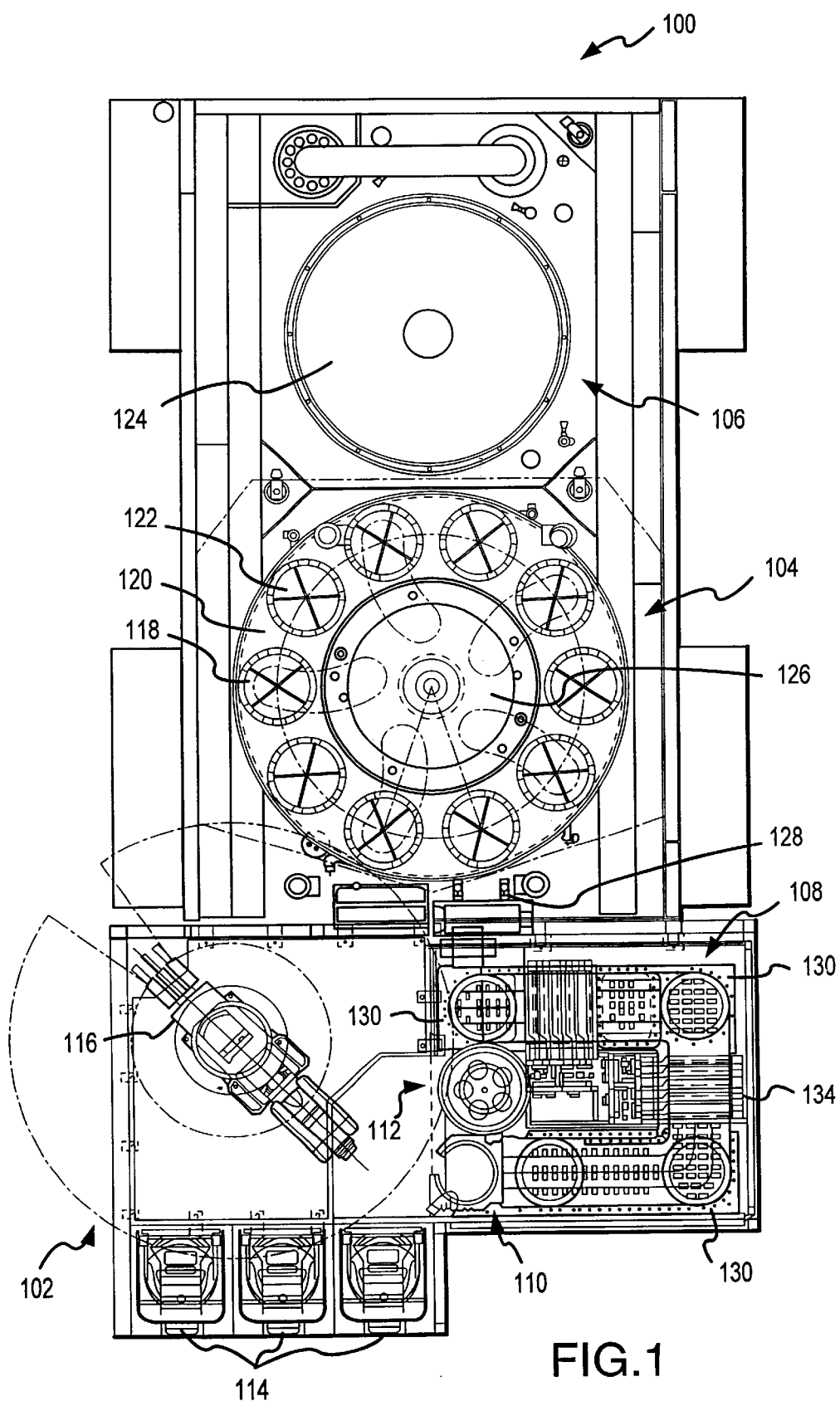
FIG. 1 is a top view of an exemplary semiconductor wafer processing system that may incorporate a distributed control system in accordance with the present invention.

An exemplary semiconductor wafer processing system 100 configured to perform chemical mechanical polishing (CMP), cleaning, rinsing, and drying of semiconductor wafers is illustrated in FIG. 1. A similar wafer processing system is disclosed in U.S. patent application Ser. No. 08/926,700, entitled "Combined CMP and Wafer Cleaning Apparatus and Associated Methods," the entire content of which is incorporated herein by reference. Wafer processing system 100 generally includes a load/unload station 102, an index station 104, a CMP station 106, a cleaning station 108, a rinsing station 110, and a drying station 112. Each of the foregoing stations are described in greater detail below. It should be appreciated that the present invention is not limited to the processing of semiconductor wafers and that the present invention may be suitably configured for compatibility with any number of different workpieces.

Load/unload station 102 is configured to accommodate a plurality of wafer cassettes 114 to permit substantially continuous operation of wafer processing system 100. At least one wafer cassette 114 may contain a number of wafers to be processed and at least one wafer cassette 114 may contain a number of processed wafers. In one preferred embodiment, wafer processing system 160 processes all of the wafers in one cassette 114 before continuing on to the next cassette 114. Processed wafers are returned to their original positions in the respective cassettes 114, which facilitates effective tracking of each wafer through the fabrication process. A cassette 114 filled with processed wafers may be removed and replaced with another cassette 114 that contains a number of unprocessed wafers. Accordingly, wafer processing system 100 is capable of processing wafers in a substantially continuous and uninterrupted manner. Moreover, because wafer processing system 100 polishes, cleans, and dries the wafers in one continuous process, there is no need for separate machines and the associated downtime.

After cassettes 114 are placed into load/unload station 102 and wafer processing system 100 set for processing, a robot 116 removes wafers individually from cassettes 114 and moves them to index station 104. Robot 116 preferably includes end-effectors (not shown) configured to handle the wafers as necessary during the processing cycle. Each end-effector preferably includes a sensor for detecting the presence or absence of a wafer on the end-effector. If a wafer is lost from an end-effector during transport of the wafer, the sensor will promptly detect the error and send a signal to the robot controller and/or the machine controller to stop system processing and sound an alarm.

After entering index station 104, robot 116 places each wafer device side down onto one of a plurality of load cups 118 residing on an index table 120. Index table 120 also includes a plurality of wafer unload cups 122 which alternate with load cups 118. After a wafer is deposited on one of the plurality of load cups 118, index table 120 rotates to appropriately position a new load cup 118. Robot 116 then places the next wafer on the new empty load cup 118. This process continues until all load cups 118 are filled with wafers. Index table 120 preferably includes five load cups 118 and five unload cups 122.

Figure 1A:
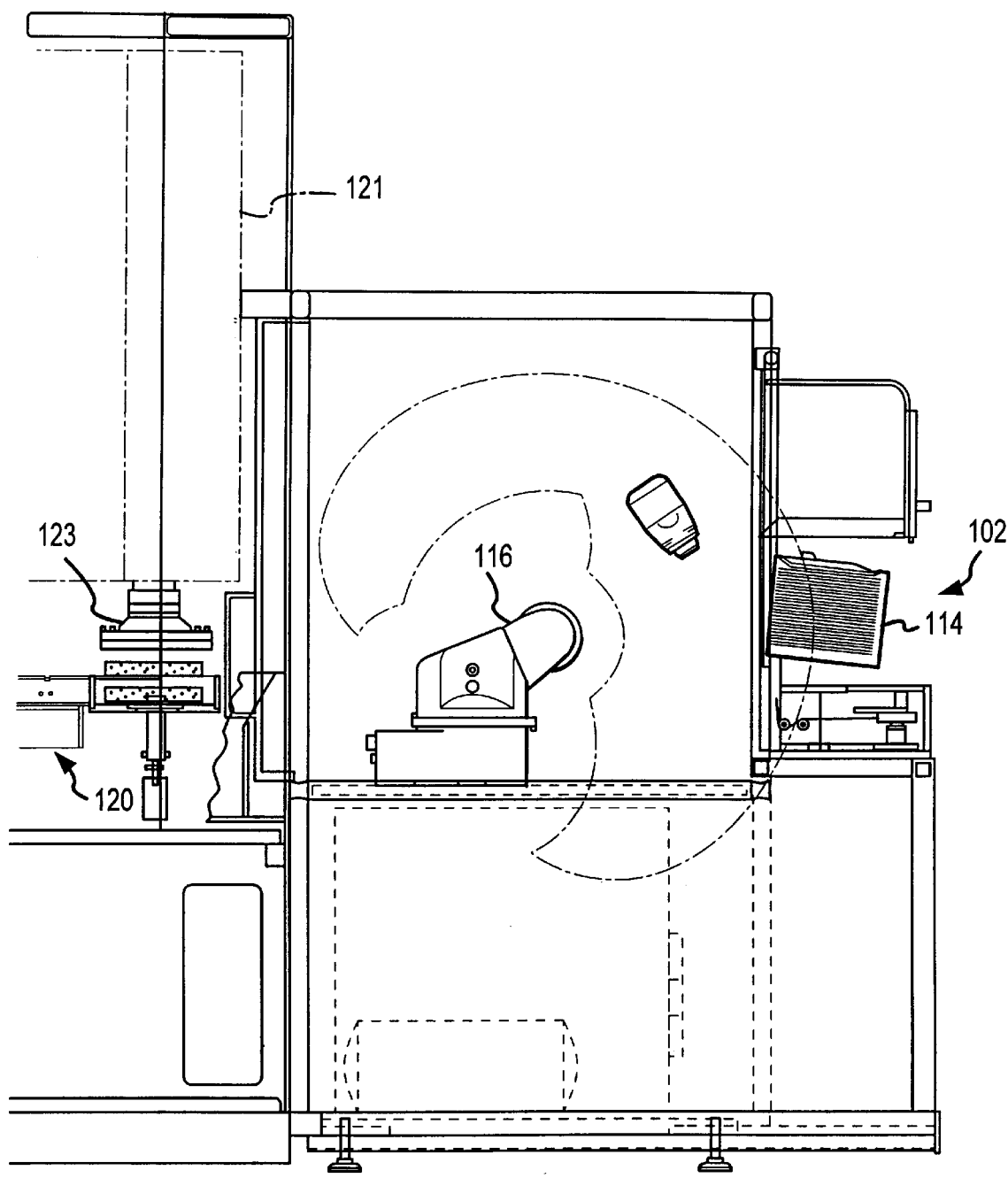
FIG. 1a is a side view of a portion of the wafer processing system shown in FIG. 1.

Next, a multihead wafer carrier transport assembly (MHTA) 121 having individual wafer carrier elements 123 (see FIG. 1a) aligns itself over index table 120, such that respective carrier elements 123 are positioned directly above the wafers residing in respective load cups 118. For clarity, FIG. 1a only depicts one of the five carrier elements 123. When MHTA 121 is suitably aligned with index table 120, MHTA 121 lowers the carrier elements 123 into proximity with the wafers such that the carrier elements 123 can retrieve the wafers from load cups 118. After each carrier element 123 obtains a wafer, the MHTA 121 moves the carrier elements 123 with their respective wafers laterally into CMP station 106 and positions the wafers above a polishing table 124. Once above polishing table 124, the MHTA 121 lowers the carrier elements 123 such that the wafers are pressed into operative engagement with a polishing surface disposed upon polishing table 124. During polishing, polishing table 124 and the polishing surface disposed thereon rotate about their vertical axes. Simultaneously, the individual carrier elements 123 spin the wafers about their respective vertical axes and oscillate the wafers back and forth across polishing table 124 as the wafers are pressed against the polishing surface. In this manner, the surfaces of the wafers are polished and/or planarized.

After an appropriate period of processing time, the wafers are lifted from the polishing surface, and transported back to index station 104. At this time, the wafers may be polished on a second polishing table 126, if desired. Next, the MHTA 121 lowers the individual carrier elements 123 to deposit the wafers into unload cups 122. After a batch of polished wafers has been deposited into unload cups 122, index table 120 rotates and the carrier elements 123 are again lowered to receive a new set of wafers from load cups 118 for polishing. While the next wafers are being polished in CMP station 106, robot 116 loads a new set of wafers into load cups 118, and a flipper arm 128 removes the recently processed wafers from unload cups 122 and transfers them to cleaning station 108. As discussed in more detail below, flipper arm 128 lifts the wafers out of index station 104 and transfers them onto a water track 130 resident at cleaning station 108.

Cleaning station 108 may include a number of water tracks 130 configured to transport the wafers in a wet environment and in a manner that minimizes physical contact with the surfaces of the wafers. While on water track 130, a wafer is supported by fluid which is projected upwardly from the plane of water track 130 through a plurality of fluid jets such that mechanical contact between the wafers and the water tracks is substantially eliminated. Water tracks 130 may also include a number of fluid jets that are oriented to urge the wafers along the respective paths. Cleaning station 108 may employ a number of timing and staging mechanisms to ensure that the wafers travel through cleaning station 108 in a regulated manner.

Cleaning station 108 preferably includes a first scrub station 132 and a second scrub station 134 positioned after first scrub station 132. Each of the scrub stations 132 and 134 preferably include an enclosure, e.g., a scrubber box, containing a plurality of scrubbing rollers. The scrub stations 132 and 134 may include fluid inlet ports (nxot shown) to facilitate the application of suitable cleaning fluids onto the scrubbing rollers. The rollers are preferably arranged in pairs that are configured to drive wafers through the scrubber box and to simultaneously clean the top and bottom flat surfaces of wafers passing therethrough. The roller pairs may rotate at any suitable drive or process speed, depending upon the particular wafer processing recipe. By allowing an operator to dynamically configure the rotational speed of the rollers, substantial processing flexibility is achieved in scrub stations 132 and 134.

Each of the scrub stations 132 and 134 may include a fluid nozzle (not shown) at the location where wafers exit the scrubber boxes to rinse or flush the wafers as they exit the scrubber boxes. This intermediate rinsing procedure ensures that loosened particles do not settle back on the wafer surface as the wafer exits the scrub stations 132 and 134. Alternatively, instead of using a spray nozzle, the intermediate rinsing may be accomplished by increasing fluid flow in the appropriate wafer track 130 at the location the wafer enters such water track 130.

If desired, cleaning station 108 may further contain a hydrofluoric acid etching station (not shown) located between second scrub station 134 and rinse station 110. Alternatively, a hydrofluoric acid etching station may be incorporated into the design of a water track 130 or incorporated into the design of rinse station 110. The hydrofluoric acid etching station may include a robot or other handling device for exposing the wafer to a hydrofluoric acid solution.

Generally, rinse station 110 is configured to receive wafers in a serial manner, thoroughly rinse each wafer with one or more rinsing solutions such as deionized water, and hold each rinsed wafer for retrieval by robot 116, which thereafter transports the rinsed wafer to drying station 112. Throughput may be increased by simultaneously rinsing both the upper and lower surfaces of each wafer. The particular rinsing solutions and the duration of the rinsing procedure may vary from process to process.

Drying station 112 is preferably configured to receive and hold a wafer and to spin the wafer at a high speed. As the wafer is spun, the centrifugal forces applied to the wafer draws water droplets radially outwardly and off of the wafer surfaces. To augment this drying process, an air flow module (not shown) may be mounted above drying station 112 to direct a column of forced air across the upper wafer surface. Once spin drying is complete, robot 116 retrieves the dried wafer and returns the dried wafer to the slot of the cassette from which the wafer originated.

A number of sensors may be located throughout wafer processing system 100 to facilitate real-time monitoring of wafers during processing and/or to detect when and where errors, delays, wafer breakage, or the like occur during processing. As described in more detail below, such sensors may provide status information to a control system to enable optimization of batch processing through wafer processing system 100.

Those skilled in the art will appreciate that the present invention is in no way limited to the specific processing stations set forth above. Indeed, any number of equivalent, alternative, or additional workpiece processing stations may be implemented in wafer processing system 100 and the particular configuration of such processing stations may vary from application to application.

Figure 2:
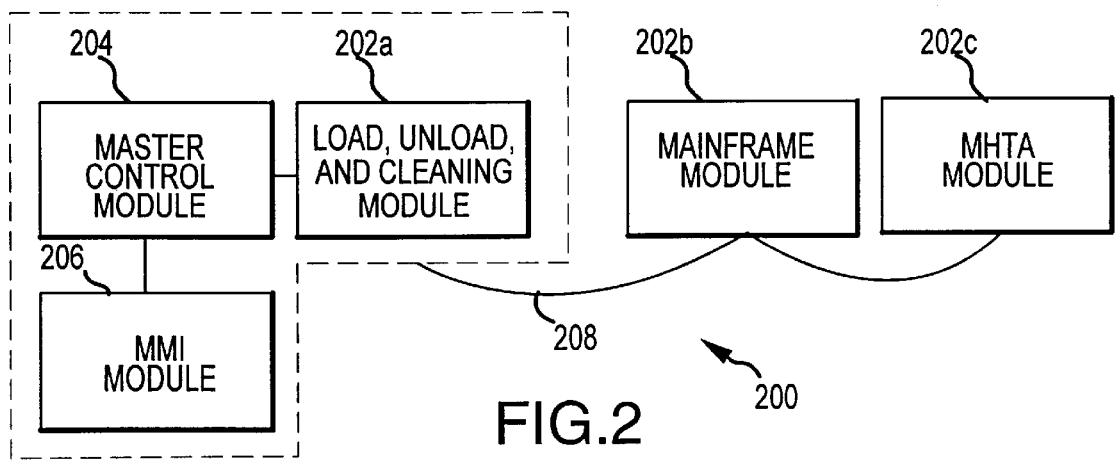
FIG. 2 is a schematic diagram of an exemplary distributed control system that may be used in the wafer processing system shown in FIG. 1.

Referring now to FIG. 2, wafer processing system 100 preferably employs a distributed control system 200 in accordance with the present invention. Unlike prior art control systems that utilize a backplane architecture, control system 200 enables independent operation of a number of discrete sub-systems within wafer processing system 100. The control architecture of the present invention enables true parallel control of the different processing stations within wafer processing system 100, which allows the throughput of wafers to be optimized.

Control system 200 generally includes a plurality of control modules configured to carry out a number of functions associated with wafer processing system 100. In the preferred embodiment, each of the control modules are physically similar, i.e., each module is configured as a physically compatible plug-in device that is capable of being loaded with application-specific software. The control modules may be physically located throughout wafer processing system 100. For example, a specific control module may be located proximate to the particular processing station that it controls. Such an arrangement enables wafer processing system 100 to be configured in a compact manner that conserves floor space.

Control system 200 preferably includes a plurality of autonomous application control modules 202, each of which is configured to control a portion of a semiconductor wafer processing procedure carried out by wafer processing system 100. In the context of this description, "autonomous" means that each of the application control modules 202 is capable of independent operation as a stand-alone control system, if needed. As described in more detail below, application control modules 202 are not functionally dependent upon a central processing module or a backplane arrangement. The autonomous nature of application control modules 202 enables them to be individually tested at a sub-system level rather than at an overall system level.

Figure 3:
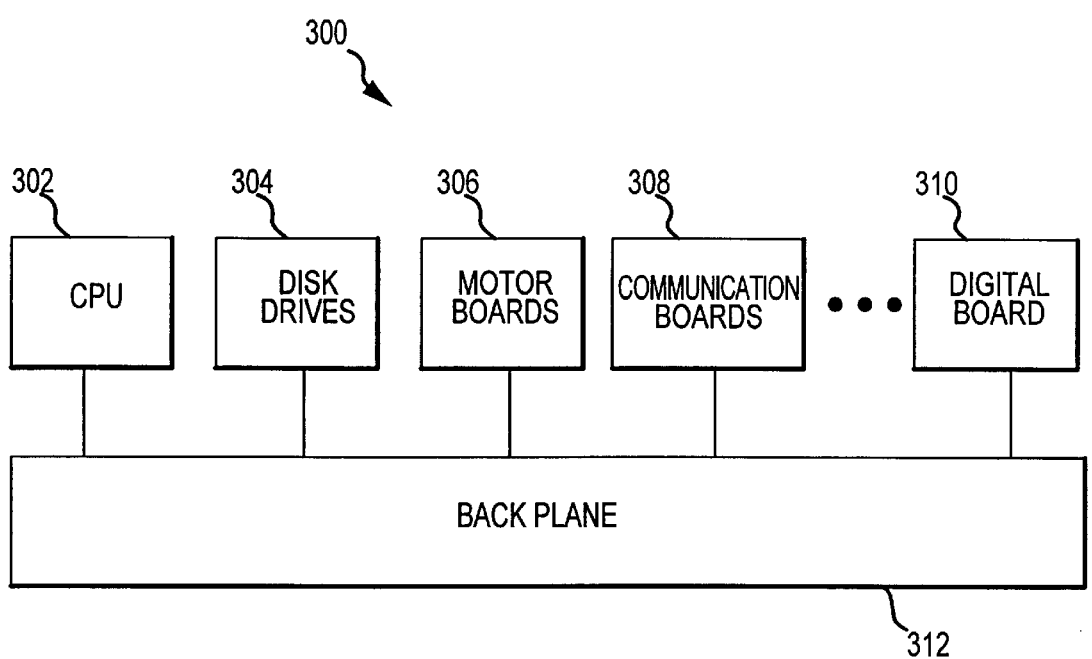
FIG. 3 is a schematic diagram of a prior art control system that may be used in the wafer processing system shown in FIG. 1.

In contrast to control system 200, FIG. 3 depicts a backplane control system 300 configured in accordance with a prior art semiconductor wafer processing system. Backplane control system 300 includes a number of functional boards or components, e.g., a processor 302, a disk drive 304, a motor board 306, a communication board 308, and a digital board 310. All of these boards and components are coupled to, and operate in conjunction with, a backplane element 312. Except for processor 302, none of the other functional boards or components are capable of independent or autonomous operation. This control system architecture depends upon the reliability and integrity of backplane 312 and processor 302; if backplane 312 or processor 302 fails, then control system 300 may fail. In this arrangement, the single processor 302 controls the operation of each of the functional boards, disk drive 304, and various other devices (not shown). Likewise, backplane 312 may include power circuitry, an address bus, a data bus, a control bus, a timing bus, and other elements that may be utilized by the functional boards. Thus, if processor 302 or backplane 312 fails, the other components of control system 300 may be rendered inoperable.

Referring back to FIG. 2, in the exemplary embodiment described herein, each application control module 202 controls the operation of at least one sub-procedure associated with wafer processing system 100. In this context, a "sub-procedure" may be any portion of the semiconductor processing procedure carried out by the particular system. As described above in connection with FIG. 1, wafer processing system 100 may include a number of processing stations configured to perform different tasks, e.g., wafer loading and unloading, wafer indexing, CMP processing, wafer cleaning, wafer rinsing, and wafer drying. The function of the various processing stations may be controlled by application control modules 202. It should be appreciated that each processing station may be associated with more than one sub-procedure and/or governed by more than one processing recipe.

Control system 200 also includes an autonomous master control module 204, which is preferably configured to communicate with and regulate the operation of each application control module 202. In the preferred embodiment, master control module 204 is configured to download setup data, e.g., processing recipes, to application control modules 202 in response to the initiation of the wafer processing procedure. Master control module 204 may also download (or periodically issue) process sequencing instructions to application control modules 202.

Furthermore, master control module 204 is preferably configured to monitor the processing status of wafers within wafer processing system 100; master control module may periodically request and receive status data from application control modules 202 to facilitate such monitoring. In the preferred embodiment, master control module 204 does not directly control any physical parameters associated with the sub-procedures, i.e., any physical changes to the wafers during processing are due to the control of application control modules 202.

As described above, the exterior housing of master control module 204 may be physically similar to each application control module 202. Furthermore, although the operational software may vary for each module, the functional components contained in master control module 204 may also be similar to those contained in application control modules 202.

As indicated by the dashed lines in FIG. 2, master control module 204 may include the functionality of at least one application control module 202. In one exemplary embodiment, master control module 204 "contains" a load/unload/clean module 202a. This implementation enables control system 200 to employ a reduced number of physical module housings by incorporating the appropriate functional software of load/unload/clean module 202a into master control module 204. Such an arrangement also takes advantage of the processing and memory capacity of master control module 204 rather than leaving some of the capacity unused.

Master control module 204 may also include or communicate with a man-machine interface (MMI) module 206. MMI module 206 preferably controls the operation and function of the user interfaces associated with wafer processing system 100. In this respect, MMI module 206 may be configured to facilitate manual operation of wafer processing system 100. For example, MMI module 206 may be associated with inputs and outputs communicated between master control module 204 and a touch screen display, a manual keyboard, a printer and/or other peripheral devices employed by wafer processing system 100. In response to various user inputs, MMI module 206 may be responsible for recipe management and selection, alarm and error management, diagnostics, calibration and setup, and the starting, stopping, and pausing of wafer processing system 100. In addition, MMI module 206 may be responsible for monitoring and conveying the status of wafer processing system 100 and the individual wafers within wafer processing system 100. Unlike load/unload/clean module 202a, MMI module 206 has no direct effect on the physical processing of the wafers.

In the preferred embodiment, application control modules 202 and master control module 204 are configured in a network arrangement. A data communication link 208 may be employed to couple the various modules together. In the exemplary embodiment shown in FIG. 2, in which master control module 204, load/unload/clean module 202a, and MMI module 206 are integrated into one physical module, communication link 208 need not be routed between each of the integrated modules. Unlike a conventional backplane arrangement that may be an active element or require additional functional components, communication link 208 is preferably configured as a passive conductor element. Such a passive conductor element may be suitably configured to carry signals applied at one end to the other end without modification of the signal content or function. For example, communication link 208 may be a suitable LAN cable having standard RJ-11 plug-in connectors, a coaxial cable, or a fiber optic cable. This network architecture enables master control module 204 to provide data to application control modules 202 in a true parallel manner. In other words, the preferred arrangement enables data transmitted by master control module 204 (or any other module) to be received by a plurality of other control modules for individual processing, interpretation, and response as needed.

Figure 4:
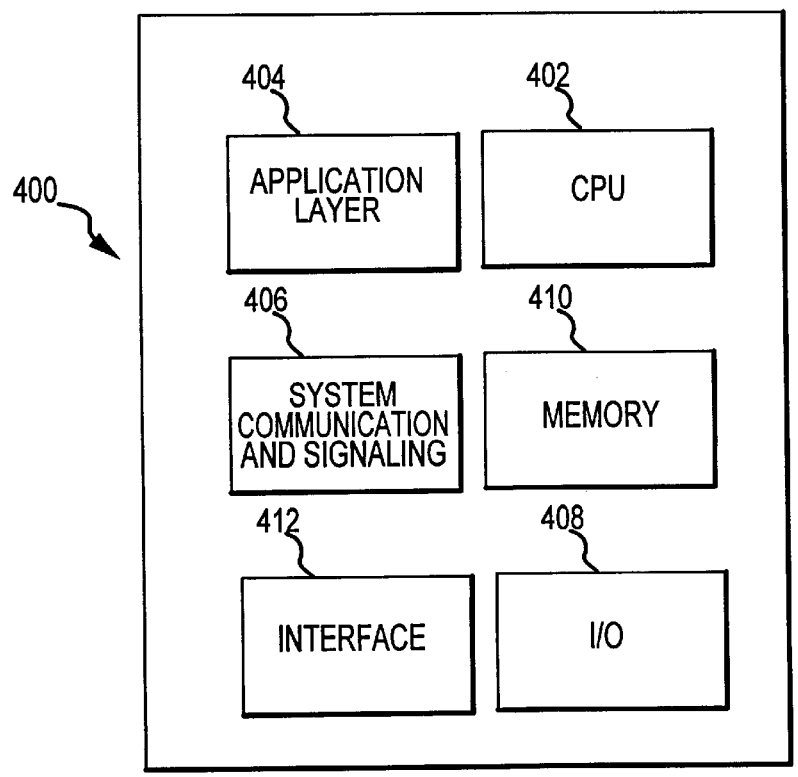
FIG. 4 is a schematic diagram of an general autonomous control module that may be used by the distributed control system shown in FIG. 2.

Referring to FIG. 4, an exemplary application control module 400 is depicted in a block diagram form. As described above, each application control module 202 is preferably configured in a similar and compatible manner. This feature allows any given application control module 202 to be programmed or reprogrammed in accordance with the desired sub-procedures and processing stations. Although not shown in FIG. 4, application control module 400 may include a number of additional components for performing conventional operations.

Application control module 400 preferably includes a processor 402 configured to control the function of application control module 400 and to perform various processes by executing software programming instructions. Processor 402 is configured to control a number of application layer functions 404 associated with a portion of the wafer processing procedure. Such application layer functions may be related to the overall operation of one or more processing stations (see FIG. 1 and accompanying description) or more specifically related to one or more sub-procedures performed by any given station. The application layer functions 404 may be suitably defined by application-specific software associated with the particular wafer processing system 100. Thus, control system 200 may be easily adapted for use with a number of different processing systems by specifying the particular application-layer software for the desired system.

In the preferred embodiment, application layer functions for each application control module 202 are governed by software instructions that are specific to, and resident at, the respective application control module 202. In accordance with one aspect of the present invention, application control modules 202 each employ distinct software for controlling their respective sub-procedures, and the software is not transferred between application control modules 202 or between master control module 204 and any application control module 202. Rather, such module-specific software instructions merely utilize functional parameters or control data received from master control module 204. Such functional parameters may include individual processing parameters such as polishing, cleaning, and rinsing time periods, wafer carrier down force, polishing table and wafer carrier speeds, and the like.

Functional parameters may be transmitted in the form of processing recipes associated with the particular sub-procedures. In this respect, each of the processing stations associated with wafer processing system 100 preferably operates in response to at least one respective processing recipe. Processing recipes for the various sub-procedures may differ depending upon the particular batch of wafers being processed. For example, different CMP recipes may be utilized to accommodate different wafer sizes and/or compositions. In response to a user input, master control module 204 may select a plurality of processing recipes for use with the current batch of wafers. The selected recipes are received by the respective application control modules 202 prior to wafer processing.

Application control module 400 also includes one or more components (designated by reference number 406) configured to facilitate communication and internal signaling in control system 200. Communication and signaling block 406 may be realized by any number of conventional devices known to those skilled in the data processing and control signaling art. For example, communication and signaling block 406 may employ various elements configured to transmit, receive, and process internal system data that may be transferred between application control module 400, master control module 204, and/or any number of application control modules 202. Communication and signaling block 406 is configured to suitably process system data to facilitate proper execution of the relevant sub-procedures. Data associated with communication and signaling block 406 is preferably transmitted via communication link 208 (see FIG. 2). To accommodate efficient regulation of application control modules 202 during wafer processing, master control module 204 and application control modules 202 are preferably configured to support bi-directional data transfer therebetween. Thus, if necessary, two application control modules 202 may communicate between one another without having to communicate with master control module 204.

Application control module 400 may also include a suitable input/output element 408. Input/output element 408 is configured to receive and provide data associated with the portion of the wafer processing procedure controlled by application control module 400. Input/output element 408 provides the control signals that are used by wafer processing system 100 to make changes to the physical state of the wafers or to move the wafers during processing. In this respect, input/output element 408 is distinguishable from communication and signaling block 406, which is associated with internal data and signals.

In addition to the above components, application control module 400 includes at least one memory element 410 having a suitable storage capacity and an interface 412 configured to provide suitable physical and electrical connections for the module itself, communication link 208, power connections, and the like.

The above description of application control module 400 may also apply to master control module 204. However, in a practical embodiment, master control module 204 need not include input/output element 408 because, unlike application control modules 202, it does not directly control any of the process stations.

Referring back to FIG. 2, control system 200 may include any number of application control modules 202. In the exemplary embodiment employed in combination with wafer processing system 100, control system 200 includes load/unload/clean module 202a, a mainframe module 202b, and a multihead transport assembly (MHTA) module 202c. Each application control module 202 is associated with a number of specific wafer processing functions related to one or more sub-procedures. Further, each application control module 202 may be associated with more than one processing station (as described above in connection with FIG. 1). It should be noted that the specific functions may vary from system to system and that the application control modules described herein are configured for compatibility with wafer processing system 100.

Load/unload/clean module 202a generally controls a number of functions associated with load/unload station 102, index station 104, and cleaning station 108. For example, load/unload/clean module 202a may control a wafer mapping procedure that associates each wafer with a specific location and/or planar orientation (desirable to enable the detection of double or cross-slotted wafers) within the respective cassette 114. Module 202a may also monitor the progress and processing status of each wafer within wafer processing system 100. Module 202a preferably controls the loading of new wafers from cassettes 114 to index station 104 and the unloading of polished wafers from index station 104 to cleaning station 108. In addition, module 202a may be configured to control the actual cleaning procedures carried out by cleaning station 108, the rinsing procedure performed by rinsing station 110, and the spin drying performed by drying station 112. After the wafers have been dried, module 202a may control robot arm 116 such that the dried wafers are suitably stored in the appropriate cassette 114.

Mainframe module 202b is preferably configured to control a number of functions associated with index station 104 and CMP station 106, in addition to other tasks carried out by wafer processing system 100. Module 202b controls index station 104 to facilitate the loading and unloading of wafers to and from the MHTA 121. Module 202b may control a suitable drive motor for rotating the index table 120 associated with index station 104 such that the proper wafers are aligned with the MHTA 121 at the appropriate time. Module 202b is further configured to control the movement of the MHTA 121 between primary polishing table 124 and secondary polishing table 126.

Module 202b may also control a number of drive motors that rotate primary polishing table 124 and secondary polishing table 126 at suitable speeds governed by the appropriate polishing recipes. In addition to controlling the rotational speeds of the polishing tables, module 202b may control the acceleration ramp times associated with transitions between speeds. In connection with CMP station 106, module 202b also controls the conditioning of the polishing surface located on primary polishing table 124. Such conditioning may be carried out by any number of devices such as an actuated conditioning ring that engages the primary polishing surface between polishing cycles.

A number of fluid and power delivery features are preferably controlled by mainframe module 202b. For example, module 202b may control the flow rate, fluid pressure, and timing of delivery of a suitable rinsing agent, e.g., deionized water, for rinsing of the wafer carriers and the wafers during processing by CMP station 106. Module 202b is also configured to suitably control the distribution and flow of the CMP slurries used during polishing of the wafers. The particular type of slurry, the flow rate, the start and stop times, and the like, may be set forth in an appropriate CMP recipe. Mainframe module 202b may also control the conditioning and distribution of operating power for wafer processing system 100.

As described briefly above, MHTA module 202c controls a number of operations related to the MHTA 121 and the individual wafer carriers 123. For example, MHTA module 202c is preferably configured to control a number of motors that govern the oscillation and rotation of the wafer carriers 123. MHTA module 202c also controls the amount of down force applied by each wafer carrier 123 via, e.g., a pneumatic actuation system. The current CMP recipe may dictate, among other things, the specific oscillation and rotational speeds, the oscillation ranges, the down force, and transitional ramp times between different speeds and down forces associated with the operation of the MHTA 121. MHTA module 202c may also control various fluid and pneumatic systems that perform the loading and unloading of wafers from the wafer carriers 123. Such loading and unloading typically occurs when the MHTA 121 interacts with index station 104.

Application control modules 202 may control any number of additional functions not specifically described herein. Furthermore, control system 200 may incorporate more or less application control modules 202 depending upon the configuration of wafer processing system 100.

Figure 5:
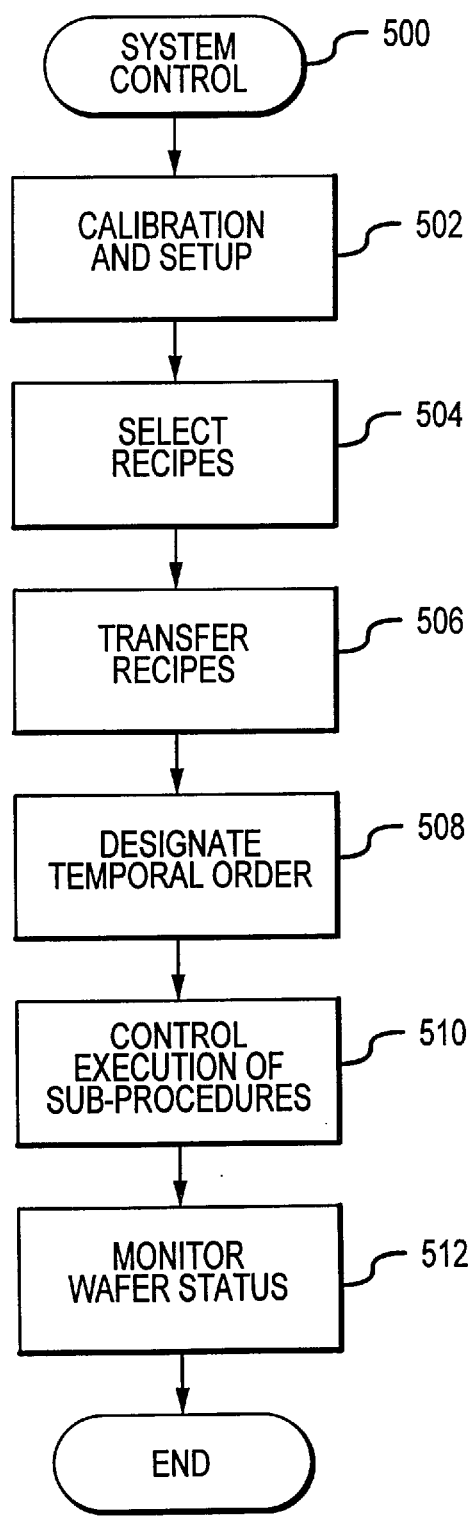
FIG. 5 is a flow diagram of an exemplary system control process that may be performed by the wafer processing system shown in FIG. 1.

An exemplary control process 500, which may be carried out in the context of wafer processing system 100, is depicted as a flow chart in FIG. 5. Process 500 may be performed by control system 200 for each batch of wafers. Depending upon the particular application, process 500 may include more or less steps than shown, and process 500 may be incorporated into a larger overall processing or control scheme.

Control process 500 may begin with a task 502, during which control system 200 causes wafer processing system 100 to enter a calibration and setup mode. Task 502 may cause wafer processing system 100 to calibrate motor speeds, carrier downforces, axis alignments, and other functional parameters. The calibration routine may be responsive to manual inputs, written operator instructions, and/or programmed automatic calibration processes. Automatic calibration processes may be initiated by the entry of any number of calibration parameters into a suitable calibration software program. Any residual recipes stored in application control modules 202 are preferably cleared during task 502 in preparation for the next batch of wafers. The setup procedure may obtain a temporal order associated with the processing recipes and/or the respective sub-procedures performed by the various processing stations. The temporal order may be input by an operator of wafer processing system 100 during the setup mode. Such temporal ordering may differ according to the particular type of wafers in the current batch. Accordingly, task 502 may also obtain a current wafer batch designation from an operator of wafer processing system 100, automatically by a wafer interrogation device, or in any suitable manner.

A task 504 is performed prior to processing of wafers. Preferably in response to an operator input, task 504 causes master control module 204 to select a plurality of processing recipes for the next wafer processing procedure to be performed by wafer processing system 100. Alternatively, task 504 may be responsive to any selection criteria associated with the particular wafers to be processed. As described above, the various sub-procedures may be performed in accordance with the processing recipes selected during task 504. Accordingly, a task 506 may be performed to transfer the processing recipes from master control module 204 to the appropriate application control modules 202. The processing recipes may be transferred by downloading instructions and/or data via communication link 208. After the processing recipes are downloaded, application control modules 202 are capable of performing the respective portions of the wafer processing procedure.

A task 508 may be performed to designate the temporal order for execution of the processing recipes and/or the respective sub-procedures performed by system 100. Task 508 may prompt master control module 204 to download suitable instructions to application control modules 202 prior to wafer processing. Alternatively, master control module 204 may provide such instructions to each application control module 202 as the wafers progress through wafer processing system 100. It should be appreciated that task 508 enables an operator to determine which sub-procedures are utilized, when the various sub-procedures are performed and, if necessary, whether a particular sub-procedure is repeated. This flexibility allows wafer processing system 100 to vary the order and number of processing steps associated with different wafer batches.

Following task 508, a task 510 may be performed by master control module 204. During task 510, master control module 204 controls the execution of the various sub-procedures associated with the respective processing recipes. In the preferred embodiment, master control module 204 transmits control signals to application control modules 202; the control signals indicate when to initiate and when to terminate the respective portions of the wafer processing procedure performed by the processing stations. Accordingly, task 510 may be performed in response to the temporal order designated in task 508.

As described above, master control module 204 need not be directly involved in the functional control of the individual processing stations because application control modules 202 perform that role. In other words, once prompted by master control module 204, application control modules 202 are capable of independently controlling their respective portions of wafer processing system 100. In accordance with one aspect of the present invention, task 510 is performed in a parallel manner for a plurality of application control modules 202. Such parallel control enables wafer processing system 100 to optimize wafer throughput and to simultaneously process multiple wafer types that may require different processing recipes.

During the wafer processing, control system 200 may suitably monitor, with, e.g., master control module 204, the processing status of a number of wafers within wafer processing system 100 (task 512). Although the preferred embodiment monitors each wafer as it progresses through wafer processing system 100, task 512 may only be performed for certain wafers or for certain batches. Application control modules 202 may periodically send data to master control module 204 to inform master control module 204 of the current processing status. Alternatively (or additionally), wafer processing system 100 may include a number of detection sensors for detecting the presence of wafers at different locations throughout wafer processing system 100. In response to monitoring task 512, individual wafers can be effectively tracked for purposes of inventory control, optimization of throughput, recovery after an unplanned shutdown, or the like.

Control process 500 may be performed in a continuous fashion to enable wafer processing system 100 to receive unprocessed wafers without interruption. If the same processing recipes and processing scheme are to be employed for multiple batches of wafers, then tasks 502, 504, 506, and/or 508 need not be repeated.

Figure 6:
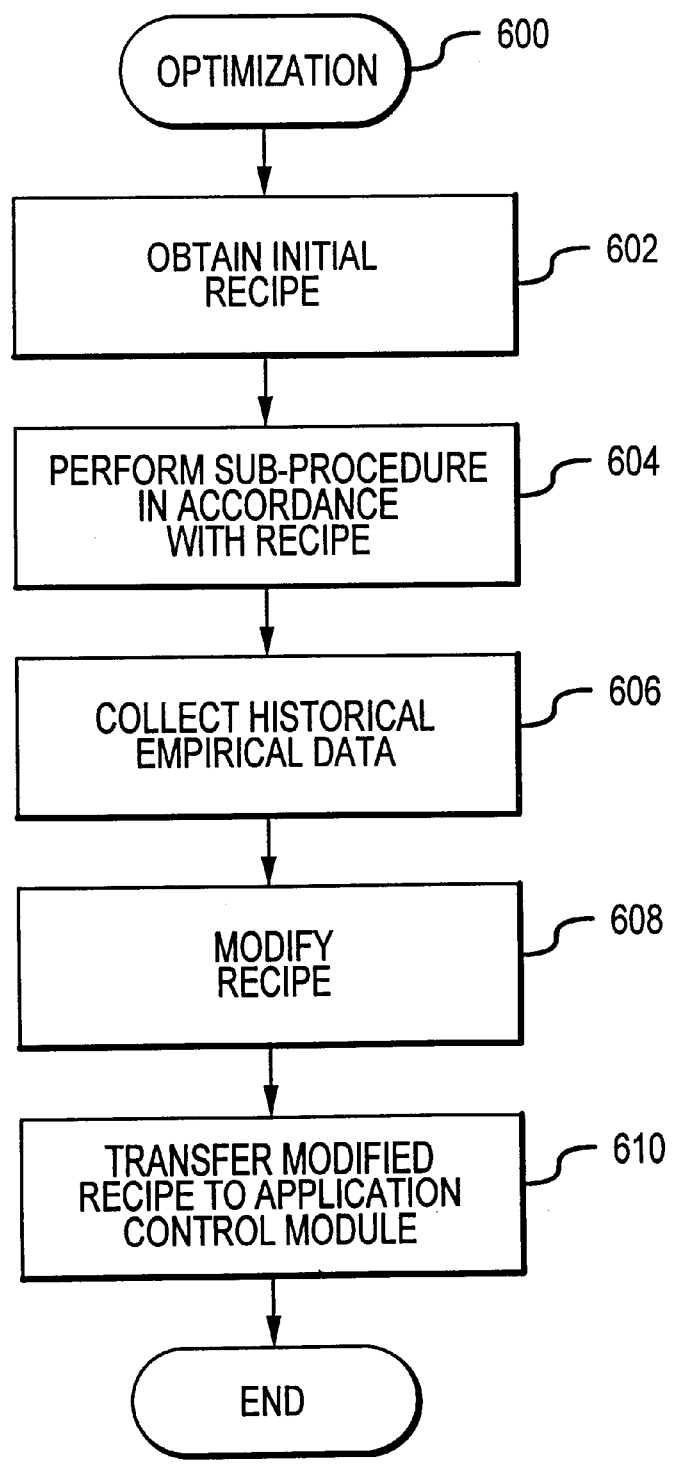
FIG. 6 is a flow diagram of an exemplary optimization process that may be performed by the wafer processing system shown in FIG. 1.

Control system 200 may also be configured to enable the optimization of one or more recipes or sub-procedures in accordance with actual processing results. FIG. 6 depicts an exemplary optimization process 600 that may be carried out by wafer processing system 100 to modify a wafer processing recipe. It should be appreciated that any recipe may be optimized during process 600, whether or not such recipe is directly related to physical changes in the wafers. For example, process 600 may be performed to optimize the operation of the MHTA 121 or other components that handle the transport of wafers within system 100. For illustrative purposes, process 600 is described below in the context of a CMP recipe.

Process 600 begins with a task 602, which causes an application control module 202 to obtain an initial recipe from master control module 204 (as described above). Next, a task 604 causes wafer processing system 100 to perform the respective sub-procedure in accordance with the initial recipe. As described above, the initial recipe is downloaded to the appropriate application control module 202, which then controls the relevant sub-procedure. While the subprocedure is executing (or after the sub-procedure has been performed), a task 606 may be prompted.

Task 606 collects historical empirical data for a wafer processed in accordance with the initial recipe. Task 606 may employ any number of detection, interrogation, or measurement systems to obtain suitable data related to the performance of the particular sub-procedure. For example, in the context of a CMP sub-procedure, a polishing recipe may dictate the down force, table speed, polishing time, and other parameters that impact the amount of material that is removed from the wafer surface. Task 606 may perform a thickness measurement to determine whether the polishing process has removed a sufficient amount of material.

Following task 606, a task 608 may be performed to modify the initial recipe in response to the historical empirical data. Regardless of the specific sub-procedure and recipe under analysis, task 608 may compare the empirical results to any number of ideal conditions to generate a differential quantity. In accordance with such analyses, the initial recipe is preferably modified in a manner such that the next iteration of the sub-procedure will yield different empirical results. In the preferred embodiment, the initial recipe is changed into a modified recipe at master control module 204. The initial recipe may be retained for archival purposes at master control module 204.

A task 610 causes master control module 204 to suitably transfer the modified recipe to the respective application control modules 202. As described above, application control modules 202 are configured to follow the currently-loaded recipes until such recipes are changed or cleared. Accordingly, the respective application control module 202 will operate in accordance with the modified recipe for the following process iteration. Of course, control system 200 may employ any number of suitable timing or scheduling protocols to ensure that recipes are not changed during an active processing period.

Following task 610, optimization process 600 ends. Process 600 may be repeated for any number of individual or combined recipes, and the respective sub-procedures may be suitably optimized until the empirical results satisfy any number of predetermined criteria. This optimization feature takes advantage of the flexible nature of control system 200 and the independent operability of application control modules 202.

In summary, the present invention provides an improved control system that increases the efficiency, reliability, and robustness of a multifunction semiconductor processing system. The control system is distributed in nature and it includes a plurality of independent control modules associated with a number of subsystems employed by the semiconductor processing system. When the control system is employed, each subsystem may be individually tested and diagnosed without having the entire processing system active. The nature of the control system also enables the regulation and control of different processing recipes during a single continuous run. Furthermore, the control system may control and regulate the various subsystems in a parallel manner to thereby reduce downtime and increase wafer throughput.

The present invention has been described above with reference to a preferred embodiment. However, those skilled in the art will recognize that changes and modifications may be made to the preferred embodiment without departing from the scope of the present invention. For example, in addition to the processing system described herein, the principles of the present invention may be applied to any number of workpiece processing systems. Furthermore, the distributed control system may be configured to control and regulate any number of different system functions and procedures, and any given application control module may be configured to control any number and type of specific operations. These and other changes or modifications are intended to be included within the scope of the present invention, as expressed in the following claims.

What is claimed is:

1. A distributed control system for use in a multifunction semiconductor wafer processing system having a plurality of processing stations, said control system comprising:

a plurality of autonomous application control modules, each being configured to control a portion of a semiconductor wafer processing procedure;

an autonomous master control module configured to communicate with and regulate the operation of each of said application control modules; and a data communication link configured to connect each of said application control modules and said master control module into a network arrangement:

wherein:

each of the processing stations operates in response to a respective processing recipe;

said master control module is configured to select a plurality of processing recipes for said semiconductor processing procedure; and each of said application control modules is configured to receive at least one of said processing recipes from said master control module.

2. A distributed control system according to claim 1, wherein each of said application control modules comprises:

a processor configured to control a number of application layer functions associated with a portion of said semiconductor wafer processing procedure;

means for signaling between at least one other of said application control modules or between said master control module, said means for signaling being configured to transmit, receive, and process internal system data; and an input/output element configured to receive and provide data associated with said portion of said semiconductor wafer processing procedure.

3. A distributed control system according to claim 2, wherein, for each of said application control modules:
  said application layer functions are governed by software instructions specific to and resident at the respective application control module; and
  said software-instructions utilize functional parameters received from said master control module.

4. A distributed control system according to claim 1, wherein said master control module comprises:
  a processor configured to regulate the operation of each of said application control modules; and
  means for signaling between at least one other of said application control modules, said means for signaling being configured to transmit, receive, and process internal system data.

5. A distributed control system according to claim 1, wherein said data communication link comprises a passive conductor architecture.

6. A distributed control system according to claim 1, wherein said application control modules and said master control module are configured to support bi-directional data transfer therebetween.

7. A distributed control system according to claim 1, wherein said master control module is further configured to monitor the processing status of each of a plurality of semiconductor wafers within said wafer processing system.

8. A method for controlling a multifunction semiconductor wafer processing system having a plurality of processing stations, said method comprising the steps of:
  selecting a plurality of processing recipes for a semiconductor wafer processing procedure to be performed by said wafer processing system;
  transmitting a processing recipe from an autonomous master control module to an autonomous application control module, said application control module being configured to control a sub-procedure associated with said semiconductor wafer processing procedure in accordance with said processing recipe; and
  controlling, with said master control module, the initiation and termination of said sub-procedure, said controlling step being performed after said processing recipe is resident at said application control module.

9. A method according to claim 8, wherein:
  said semiconductor wafer processing procedure comprises a plurality of sub-procedures;
  said transmitting step transmits a plurality of processing recipes from said master control module to a plurality of autonomous application control modules, each of said processing recipes being associated with at least one of said sub-procedures; and
  said controlling step is performed in parallel for a plurality of said application control modules.

10. A method according to claim 9, wherein:
  said method further comprises the step of designating a temporal order for execution of said sub-procedures; and
  said controlling step is performed for each of said sub-procedures in accordance with said temporal order.

11. A method according to claim 8, further comprising the step of monitoring, with said master control module, the processing status of each of a plurality of semiconductor wafers within said wafer processing system.

12. A method according to claim 8, further comprising the steps of:
  collecting historical empirical data for a semiconductor wafer processed in accordance with said processing recipe; and
  modifying said processing recipe in response to said historical empirical data to thereby obtain a modified processing recipe.

13. A method according to claim 12, further comprising the step of transmitting said modified processing recipe from said master control module to said application control module.

14. A distributed control system for use in a multifunction semiconductor wafer processing system having a chemical mechanical polishing (CMP) station and a wafer carrier assembly, said control system comprising:
  A first application control module configured to control a polishing table associated with said CMP station;
  a second application control module configured to control operating characteristics of said wafer carrier assembly; and
  a master control module configured to communicate with and regulate the operation of each of said first and second application control modules; wherein
  at least one of said first and second application control modules is capable of autonomous operation relative to said master control module.

15. A distributed control system according to claim 14, wherein:
  said multifunction semiconductor wafer processing system further comprises a wafer load/unload station; and
  said distributed control system further comprises a third application control module configured to control operating characteristics of said wafer load/unload station.

16. A distributed control system according to claim 15, wherein said master control module comprises at least one of said first, second, and third application control modules.

17. A distributed control system according to claim 14, further comprising a data communication link configured to connect each of said application control modules and said master control module into a network arrangement.

18. A distributed control system according to claim 14, wherein:
  each of said CMP station and said wafer carrier assembly operates in response to at least one respective processing recipe;
  said master control module is configured to select a plurality of processing recipes for said semiconductor processing procedure; and
  each of said application control modules are configured to receive at least one of said processing recipes from said master control module.

* * * * *